Patented July 21, 1953

2,646,417

UNITED STATES PATENT OFFICE 2,646,417

RIGID THERMOPLASTIC COMPOSITIONS COMPRISING VINYL HALIDE POLYMERS WITH INTERPOLYMERS OF STYRENE AND ACRYLONITRILE

Garland B. Jennings, Cleveland, Ohio, assignor to The B. F. Goodrich Company, New York, N. Y., a corporation of New York No Drawing. Application February 20, 1951, Serial No. 211,984

11 Claims. (Cl. 260—45.5)

The present invention relates to thermoplastic vinyl halide polymer compositions of improved processability and improved chemical, physical and electrical properties, and pertains more particularly to normally hard, tough and very rigid thermoplastic vinyl halide polymer compositions requiring no liquid or other plasticizing materials to be readily susceptible to processing operations. Still more particularly, the invention relates to the production of hard, tough and rigid thermoplastic vinyl halide polymer compositions which are easily processed by conventional operations such as milling, molding, calendering and extruding, and which, by virtue of unique thermoplasticity characteristics, possess the ability to be formed and shaped into final products by techniques such as deep drawing, embossing, machining and the like.

The vinyl halide resins such as polyvinyl chloride are normally hard and horny materials but are recognized as having excellent chemical and physical properties in the unplasticized state. In the past it has been the experience that these resins, because of their hard and horny nature, must be modified in order to be more easily shaped and formed into useful articles. The modification of vinyl halide resins has been accomplished heretofore in two ways, one by adding a plasticizer such as certain high-boiling ester-type materials and the other by copolymerizing the vinyl halide with one or more copolymerizable materials, such as vinyl acetate, alkyl acrylates, vinylidene chloride and the like, which contribute softness and increased plasticity to the copolymer. Both of these methods of modification, while improving processability, produce other affects which limit the field of usefulness of the resin. For example, when plasticizers are incorporated into polyvinyl chloride as to improve its processability the resulting compositions are considerably softer and weaker and less desirable chemically and electrically than the original resin. As a matter of fact, the effects of small additions of plasticizer begin to show up in restricted end-use properties before processability of the resin is noticeably improved. Similarly, when the usual comonomers are incorporated with vinyl chloride during its polymerization so as to produce a more readily processable copolymer, the resulting copolymer is also less desirable from the standpoint of physical, chemical and electrical properties than polyvinyl chloride, and this degradation of properties occurs upon addition of amounts of comonomer too small to produce a copolymer of significantly improved processability.

Moreover, the usual vinyl halide copolymers, although more readily processed than homopolymers, still do not possess, without added plasticizer, the ease of processing often desired. For good processing, the particles of polymer or resin must fuse readily under heat and pressure to produce a homogeneous final product. This property is necessary in all processing operations and is of paramount importance in a vinyl halide resin for molding purposes. After fusion the stock should evidence the characteristic of rolling or flowing over itself sufficiently to produce thorough cohesion of particles and to maintain the stock in the bank at fusion temperatures. This latter property is not possessed by many vinyl halide copolymers, even though they fuse readily, and is especially important in extruding, calendering, and milling. For injection molding, a vinyl resin must also possess a quick flow characteristic not easily attained in unplasticized vinyl resins. Finally, since processing operations are conducted between the softening and decomposition points of the resin, the fact that unplasticized vinyls require higher processing temperatures plus the fact that unplasticized vinyls are subject to severe frictional heat build-up during processing makes temperature control during processing extremely difficult. For these reasons a vinyl resin should have sufficient spread between the softening and decomposition temperatures. No known unplasticized vinyl halide resin possesses all of these properties to a sufficient degree as to be easily processable in all types of equipment.

It is among the objects of this invention therefore to provide vinyl halide polymer compositions which are susceptible to processing without addition of plasticizing materials in all types of equipment and at temperatures well below the decomposition point. It is also an object of this invention to provide easily processable thermoplastic vinyl halide polymer compositions, which are possessed of the superior physical properties of unplasticized resins and which, in addition, are possessed of unique resistance to chemicals and solvents, improved electrical properties, improved low temperature impact strength, improved low temperature flexibility, and other useful properties.

I have now discovered that unplasticized vinyl halide polymers may be rendered easily processable at reduced temperatures with the production of greatly superior products by adding to the vinyl halide resin a small amount of a hard, tough, high molecular weight interpolymer of styrene and acrylonitrile, or an equivalent thereof as hereinafter to be more fully described, and forming an intimate, homogeneous mixture thereof such as by mastication under the influence of heat. The composition resulting from the mixture of an essentially unplasticized vinyl halide resin with the styrene acrylonitrile interpolymer is hard, tough and very rigid yet is easily processed at temperatures as low as or lower than that at which the vinyl halide resin in its soft plasticized forms can be processed, shaped and formed. I have also found that the processing characteristic of a composition resulting from the admixture of the styrene acrylonitrile interpolymer with a plasticized vinyl halide resin are superior to those of the plasticized vinyl resin itself.

The compositions of this invention have unique properties not possessed by ordinary plasticized vinyl halide resins including improved electrical properties, improved solvent and chemical resistance, tensile strengths considerably greater than ordinary vinyl resins, greatly improved resistance to heat distortion, improved heat and light stability and improved low temperature impact strength and flexibility. In addition the compositions of this invention are capable of being processed at moderate temperatures without addition of liquid plasticizing materials and can be processed by such techniques as drawing and racking into strong monofilaments, embossing with attractive designs and then deep drawing into various shapes, and can be welded and machined in a variety of ways.

In carrying out the present invention the two resins are blended in any convenient manner such as by first blending the particulate dry resins and then masticating the powder mixture until a homogeneous sheet is formed. The resins may be blended directly in a Banbury mixer or on a plastic mill by first working one resin until homogeneous and then adding the other with further mastication until homogeneity is obtained. The intermixture of the two resins may be also accomplished by first dissolving each resin in a mutual solvent, mixing the solutions and then precipitating the polymer blend from the mixed solution. The two resins may be prepared as separate aqueous dispersions and the dispersions blended and then coagulated. Still another method is to polymerize the monomeric ingredients necessary to obtain one resin and then add the monomeric ingredients of the other and continuing the polymerization as to "overpolymerize" the second resin on the particles of the first.

Regardless of the method by which the blending of the two resins is accomplished it is generally preferred that the blended resins be masticated or worked under heat and pressure to insure homogeneity. The temperature at which the mastication of the mixture is carried out is not critical and is dependent in some degree on the thermoplasticity characteristics of the two resins utilized. For example, high molecular weight polyvinyl chloride when plasticized so as to exhibit a hardness of 85 A. (Shore durometer "A." at 30° C.) requires temperatures of 280 to 300° F. to be masticated on a plastic mill. Unplasticized polyvinyl chloride containing from 1 to 10% by weight of the styrene acrylonitrile copolymer may be masticated at temperatures of about 300° F. In general, temperatures of from 200 to 400° F. will be sufficient to accomplish efficient mastication of blended compositions containing a wide range of vinyl halide and styrene acrylonitrile polymers.

The amount of the styrene acrylonitrile interpolymer utilized may be varied considerably depending on the properties and processing characteristics desired in the final product. In general, the relative ease of processing of the mixture improves as the amount of the styrene interpolymer is increased in the range of from 1 to 10% by weight based on the vinyl halide resin. For milling, Banbury mixing, extruding and calendering of a polyvinyl halide resin the use of from 2.5 to 5.0% of the styrene acrylonitrile resin is usually optimum. The toughness of the final composition increases somewhat with increasing amounts of styrene interpolymer in the range of from 1 to 40% based on the vinyl halide resin. However, in rigid unplasticized compositions for general use, it is not generally preferred to utilize more than 20% of the styrene interpolymer. Best results are obtained by the use of from 1 to 10% by weight of a hard, tough styrene acrylonitrile copolymer.

The vinyl halide resins which are utilized in the preparation of the compositions of this invention include all of the vinyl halide polymers composed predominantly of polymerized vinyl halide. Thus, there may be utilized the homopolymers of the vinyl halides such as vinyl chloride, vinyl bromide, vinyl fluoride and the like and the multi-component copolymers or interpolymers made from monomeric mixtures containing a vinyl halide together with a lesser amount of copolymerizable monoolefinic material. Monoolefinic materials which may be interpolymerized with the vinyl halides include vinylidene halides such as vinylidene chloride and vinylidene bromide; vinyl esters such as vinyl acetate, vinyl propionate, vinyl butyrate, vinyl chloroacetate, vinyl chloropropionate, vinyl benzoate, vinyl chlorobenzoate, and others; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and other; vinyl aromatic compounds such as styrene, dichlorostyrene, vinyl naphthalene, and others; alkyl esters of maleic and fumaric acid such as dimethyl maleate, diethyl maleate, and others; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone and others; and in addition other monoolefinic materials as vinyl pyridine, N-vinyl carbazole, N-vinyl pyrrolidone, ethyl methylene malonate, isobutylene, ethylene, trichloroethylene, and various other readily polymerizable compounds containing a single olefinic double bond, especially those containing the $CH_2=C<$ group.

When utilizing interpolmers or copolymers the proportions of the various monomers in the monomeric mixtures polymerized to give the interpolymer may be varied considerably as long as the vinyl halide constitutes at least 50% by weight of the total. For example, there may be used copolymers of 50 to 99%, or more preferably 70 to 95%, by weight of vinyl chloride together with 1 to 50%, more preferably 5 to 30% by weight of vinylidene chloride or a vinyl ester, or an acrylic or methacrylic ester or any of the other monoolefinic materials mentioned above, or any two, three or four of these. Tripolymers of 50 to 90% vinyl chloride, 5 to 45% vinylidene chloride and 5 to 45% of a vinyl ester such as vinyl acetate or vinyl benzoate or an acrylic or methacrylic ester are further examples of vinyl halide polymers which may be used.

The vinyl halide resin or polymer for use in the preparation of the compositions of this invention may be produced by any method known to the art such as by polymerization in solution, in mass or in aqueous medium. The preferred method of polymerization is in aqueous medium and most preferably in aqueous dispersion. When the aqueous medium contains an efficient emulsifying agent the polymer is obtained in the form of a latex or dispersion. However, a preferred method is to prepare the vinyl halide polymer in an aqueous medium containing a protective colloid or other surface active agent in order to obtain an aqueous suspension of polymer in the form of fine uniform grains or "pearls." For the latter purpose gelatin, casein, bentonite clay, starch derivatives, polyvinyl alcohol, polyacrylic acid or a salt thereof, hydrolyzed vinyl acetate polymers and others may be utilized. When a polymeric emulsion is desired the polymerization is carried out in the presence of an efficient emulsifying agent such as the fatty acid soaps including sodium oleate, potassium oleate, potassium palmitate, sodium myristate, and the like, the hymolal sulfates such as sodium isopropyl naphthalene sulfonate, the polymerized sodium salts of alkyl benzene and alkyl naphthalene sulfonic acids, the sodium salt of n-octadecyl-N-1,2-dicarboxyethyl sulfosuccinamate, and others.

The styrene interpolymer for use in the compositions of this invention may be any polymer made from monomeric mixtures containing as the two essential monomers from 50 to 90% by weight of styrene or a nuclear-substituted homolog thereof such as the chloro-, alkyl- and alkoxy-substituted styrenes and from 10 to 50% by weight of an acrylic nitrile such as methacrylonitrile, ethacrylonitrile, chloroacrylonitrile and others. Other monoolefinic monomeric materials such as those described above may be present in addition to the two essential monomers but only in minor amounts of less than 20% by weight of the total monomeric mixture. Since the use of additional monomers does not result in additional advantageous properties in the final compositions, it is preferred to utilize two-component monomeric mixtures consisting of from 65 to 85% by weight of styrene and from 15 to 35% by weight of acrylonitrile. In any case the styrene acrylonitrile polymer should be hard, tough and thermoplastic and high in molecular weight.

The styrene polymer may likewise be prepared by polymerization in solution, in mass or in an aqueous medium. The preferred aqueous polymerization medium may contain one of the above-mentioned colloidal or surface active agents in order to obtain a suspension of polymer or an efficient emulsifying agent to obtain a polymer dispersion.

The preparation of the thermoplastic vinyl halide polymer compositions of this invention will be described in greater detail in the following specific examples which are intended to be illustrative only and not as limiting the invention.

EXAMPLE 1

Polyvinyl chloride is made by the polymerization at 35 to 50° C. of the vinyl chloride contained in a mixture of materials having the following composition:

| Material | Parts/Wt. |
| --- | --- |
| Vinyl chloride | 100.0 |
| Water | 190.0 |
| Suspension agent [1] | 0.5 |
| Caprylyl peroxide | 0.15 |
| Lead acetate | 0.94 |

[1] Gelatin and bentonite clay, 50/50.

The product is obtained in the form of uniform fine particles having an average particle size of 64 microns. The polymer has an average specific viscosity (at 20° C. of a 0.4% solution in nitrobenzene) of 0.55. The polymer is recovered by filtration and is dried in an air oven.

A styrene acrylonitrile copolymer is obtained by the polymerization at 40° C. of the monomers contained in the following mixture of materials:

| Material | Parts/Wt. |
| --- | --- |
| Styrene | 75.0 |
| Acrylonitrile | 25.0 |
| Emulsifying Agent [1] | 3.0 |
| Sodium pyrophosphate | 0.5 |
| Potassium persulfate | 0.25 |
| Water | 200.0 |

[1] Decyl benzene sulfonate.

The product is obtained in substantially complete yield in the form of a fine particle size polymer latex. The latex is spray dried to obtain a very fine polymer powder.

The particulate polyvinyl chloride and the styrene acrylonitrile polymers are blended with suitable stabilizers in a spiral ribbon mixer or other powder mixing apparatus to form two compositions containing respectively 5 and 10% by weight based on the polyvinyl chloride of the styrene acrylonitrile copolymer. The dry powdery blend in each case is transferred directly to a two roll plastic mill having its rolls maintained at 300° F. The mill rolls are first closely spaced and the powdery mix passed through the rolls. The stock fuses quite readily after several passes through the rolls and a smooth rolling bank is attained. The rolls are then opened slightly and a smooth, glossy and translucent sheet is removed from the mill. The time consumed between the placing of the powder on the mill and the removal of the finished sheet is substantially less than that required to incorporate 25 to 30 parts of a liquid plasticizer such as dioctyl phthalate.

The powdery mixtures of Example 1 can be extruded as smooth rigid pipe having a wall thickness of $\tfrac{1}{16}$ inch and a cross sectional diameter of 1.5 inches in a plastic extruder having its barrel heated to 240 to 270° F., its die heated to 375° F. and a neutral (not heated or cooled) screw. Ordinary polyvinyl chloride plasticized with liquid plasticizers to a hardness of 85A requires extruder barrel temperatures of 250 to 300° F., die temperatures of 350 to 400° F. and a screw maintained at 240° F.

The unplasticized polyvinyl chloride compositions containing 5 and 10% of the styrene copolymer are calendered quite easily on a four roll calender having all calender rolls maintained at 345 to 350° F. with the obtainment of a smooth rolling bank and with no difficulties with release of the stock from the bottom roll. Unplasticized polyvinyl chloride can not be calendered on ordinary equipment at any temperature below its decomposition temperatures. In a similar fashion the unplasticized polyvinyl chloride compositions containing 5 and 10% of the styrene copolymer may be press molded in 5 to 15 minutes at 325° F. to form a smooth glossy sheet or plate of great rigidity and hardness. A plurality of smooth calendered or molded sheets of the composition from 0.005 to 0.025 inch in thickness when placed one upon another and heated under pressure between the platens of a press at 325°–350° F. form a thick plate or block having any desired thickness up to 1 or 2 inches or more. The laminae can not be separated by bending, pounding, etc. The thick blocks are machined cold without difficulty to produce gears, sprockets etc. having great wear resistance. By comparison, polyvinyl chloride containing 52 parts of dioctyl phthalate requires a molding cycle of 5 to 15 minutes or more at temperatures of 300 to 350° F. The resultant molded sheet of plasticized polyvinyl chloride has a tensile strength of 2600 lbs./sq. in and a hardness of 82 A. at 30° C. The molded sheet of polyvinyl chloride containing 10% of the styrene copolymer possesses a tensile strength of 7000 lbs./sq. in. and has a hardness of 82–85 Shore durometer "D" at 30° C.

The smooth molded or laminated sheets of the 5 and 10% compositions of Example 1 have extremely good impact resistance. They are broken only with great difficulty by hand bending or pounding over a sharp edge. The impact resistance of the 10% composition (as indicated by the falling ball method which measures the height in feet that the ball must be raised to break the sample) is superior to that of phenol-formaldehyde resins, polymethyl methacrylate and polystyrene. The impact resistance of the 10% composition is 6 feet while that of phenol-formaldehyde, polymethyl methacrylate and polystyrene is less than 0.5 feet. The impact resistance of the 10% composition at extremely low temperatures is even more outstanding as shown by the fact that at temperatures of −50 to −70° F. a nail may be driven cleanly through it without cracking the sheet. Such treatment of ordinary hard plasticized or unplasticized forms of vinyl chloride polymers, especially at sub-freezing temperatures, results in cracking or shattering of the sheet.

The resistance of the compositions of Example 1 to stiffening at low temperature is more precisely shown by the Clash-Berg stiffness test. When the twist angle obtained at a given temperature under a 20 gram load (in degrees) is plotted against temperature for the compositions of Example 1 and polyvinyl chloride plasticized with dioctyl phthalate it is found that while the plasticized composition is more flexible at 70° F. the curve of the plasticized compositions drops sharply between 70° F. and 0° F. while that of the 5 and 10% compositions of Example 1 is substantially flat from +70 to −70° F. Thus, the latter do not stiffen appreciably over a wide temperature range.

In addition, the compositions of this invention shown in Example 1 have unique thermoplastic properties. For example, a sheet of the translucent composition 0.25 inch thick containing 5% of the styrene acrylonitrile copolymer may be heated to 325° F. and a beautiful design embossed thereon closely resembling the surface of frosted glass. The embossed sheet is allowed to cool to about 225° F. and in that condition is deep drawn to form a circular bowl 16 to 30 inches or more in depth. The embossed design is not impaired or substantially distorted by the deep drawing operation.

The 10% composition of Example 1 evidences extraordinary resistance to heat-distortion as shown by the sag curve method. In the latter method a sample of the resin sheet 0.10 in. thick, one in. wide and six in. long is clamped in the jaws of the jig so as to extend therefrom as a cantilever beam. The jig containing the sample is placed in an air oven and aged for one half hour at constant temperature. The jig is then removed from the oven and the vertical distance from the unsupported tip of the sample to the bottom of the jig is measured. The temperature of the oven is raised 10° C. and the procedure is repeated until the unsupported end of the sample has been or "sagged" until it touches the bottom of the jig. The vertical distance measurements are plotted against the temperature to obtain a softening curve of the sample. The temperature at which the sag curve is extended to zero is referred to as the softening point or temperature. By this method the 10% composition of Example 1 has a sharp softening point of about 172 to 173° F. as compared to 163 to 170° F. for ordinary unplasticized polyvinyl chloride. The 10% composition shows essentially no "sag" until 155° F. (heat-distortion temperature) while unplasticized polyvinyl chloride has a heat-distortion temperature of 145° F. A copolymer of 92.5% vinyl chloride and 7.5% vinylidene chloride in the unplasticized state has a softening point by this method of 155 to 162° F. and a heat-distortion temperature of only 135° F. Thus, the thermoplastic vinyl halide polymer compositions of this invention not only are possessed of superior processing characteristics but are possessed of greatly improved heat-distortion properties.

EXAMPLE 2

The high molecular weight polyvinyl chloride utilized in the foregoing example is mixed with 50 parts by weight of di-2-ethylhexyl phthalate per 100 parts of polyvinyl chloride to yield a sheet having a hardness of 85 durometer A. at 30° C. To separate portions of this composition there are added, respectively, 5 and 10% by weight of the styrene acrylonitrile copolymer described in Example 1. In the Banbury mixer the fluxing time of such formulations as compared to that of the resin containing only the plasticizer is reduced by 10 to 25%. The resulting Banbury-mixed composition may be calendered with calender roll temperatures ranging from 5 to 10° F. lower than that required for the calendering of the plasticized polyvinyl chloride composition containing no styrene acrylonitrile copolymer.

The addition of styrene acrylonitrile copolymer to plasticized polyvinyl chloride improves the hardness, tensile and flexural strength, and heat-distortion characteristics of the resulting composition and thus masks to some extent the deleterious effects of plasticizer addition. For example, polyvinyl chloride containing only 10 parts of di-2-ethylhexyl phthalate per 100 parts of polyvinyl chloride (the minimum amount to obtain processing of this resin on ordinary equipment) has a tensile strength of 5000 lbs./sq. in. and a flexural strength of 7500 lbs./sq. in. The addition of 10% by weight based on the weight of polyvinyl chloride of the styrene acrylonitrile copolymer to the di-2-ethylhexyl phthalate containing composition raises the heat distortion temperature at least 5° F., the tensile strength to over 7000 lbs./sq. in. and the flexural strength to 14,500 lbs./sq. in.

EXAMPLE 3

Copolymers of vinyl chloride and vinylidene chloride when combined with the styrene acrylonitrile copolymer described in Example 1 form highly useful compositions which process with greater ease. For example, a copolymer made in an aqueous suspension similar to that shown in Example 1 from a monomeric mixture consisting of 92.5% by weight of vinyl chloride and 7.5% by weight of vinylidene chloride so as to exhibit an average specific viscosity of 0.40 and a copolymer made from a monomeric mixture consisting of 87.5% by weight of vinyl chloride and 12.5% by weight of vinylidene chloride and having an average specific viscosity of 0.36, are easily mill-mixed with 5 to 10% or more of the styrene copolymer of the previous examples at roll temperatures of 250 to 275° F. with the obtainment of a smooth, tight smooth rolling bank. The same copolymers containing no styrene copolymer require mill roll temperatures 10 to 15° F. higher for the incorporation of liquid plasticizers.

The effect of the addition of 5 and 10% by weight of the styrene acrylonitrile copolymer to the vinyl chloride-vinylidene chloride copolymers containing sufficient di-2-ethylhexyl phthalate plasticizer to yield a sheet of 85 A. hardness is to reduce the Banbury fluxing time by 10 to 25%. On the calender, the effect of the addition of the styrene copolymer is to reduce the calender roll temperatures required by 5 to 10° F. As in the case of the polyvinyl chloride compositions, the addition of the styrene copolymer to the unplasticized vinyl chloride-vinylidene chloride copolymers brings about improved strength, less brittleness in the rigid sheet, and improved heat-distortion properties. Results similar to those of Example 3 are obtained by blending with the styrene copolymers vinyl chloride-vinylidene chloride copolymers made from monomeric mixtures containing 50 to 99% by weight of vinyl chloride and from 1 to 50% by weight of vinylidene chloride.

EXAMPLE 4

Tripolymers made by polymerization in aqueous emulsion from monomeric mixtures comprising from 70 to 90% by weight of vinyl chloride, from 2 to 20% by weight of vinylidene chloride and from 5 to 20% by weight of either vinyl acetate or vinyl benzoate, in the unplasticized state, are tough materials ideally suited to the production of rigid molded articles such as phonograph recorders, thin calendered sheets and films, etc., and semi-rigid extruded articles such as beverage tubing, electrical insulation, etc. However, during the processing of these tripolymers on ordinary plastic processing equipment it is necessary to utilize substantial amounts of liquid plasticizers, lubricants, mold release agents, etc. in order to obtain smooth glossy products. For example, tripolymers made from monomeric mixtures consisting, respectively, of 80% by weight of vinyl chloride, 10% by weight of vinylidene chloride, and 10% by weight of vinyl acetate or vinyl benzoate and 79% by weight of vinyl chloride, 4% by weight of vinylidene chloride and 17% by weight of vinyl acetate are milled without plasticizer with mill roll temperatures of 250 to 260° F. However, on the mill the tripolymers form ragged, loose banks which do not roll sufficiently to maintain the material therein at milling temperatures and coherent sheets are obtained only with difficulty. However, the addition of only 1% by weight of the styrene acrylonitrile copolymer of Example 1 to each tripolymer greatly reduces the time to form a coherent sheet by milling at 250° F. and yields a smoothly rolling and much tighter freely rolling bank. As the amount of the styrene acrylonitrile copolymer is increased in the range of 1 to 10% corresponding improvements in the processability of the blends are obtained, but not in direct ratio. As little as 3% by weight of the styrene acrylonitrile copolymer yields optimum milling properties of the mixtures. The use of 10 to 40% by weight of the styrene copolymer in the blends yields very hard, rigid compositions suitable for molding.

The improvement in the processing of the 10% vinyl acetate tripolymer of Example 4 in other types of equipment is equally as great. For example, a composition of the tripolymer containing from 1 to 10% by weight of the styrene acrylonitrile copolymer is easily calendered at 290° F. with very smooth rolling banks and excellent release from the bottom roll. The unplasticized tripolymer without the styrene acrylonitrile copolymer requires calender roll temperatures of 300 to 350° F. but even at these temperatures the banks do not roll and are somewhat ragged and the material sticks to the bottom roll. Rigid unplasticized tripolymer compositions containing 3, 5 and 10% by weight of the styrene acrylonitrile copolymer may be fluxed in a Banbury mixer with the stock attaining normal dropping temperature of 300° F. within 2 minutes with jacket temperatures of only 250° F. Similarly, the tripolymer compositions containing 1, 3, 5 and 10% of the styrene copolymer are easily extruded to form a rigid pipe having a smooth glossy surface, a wall thickness of $\frac{1}{16}$ inch and a cross sectional diameter of 1.5 inches utilizing an extruder barrel temperature of 240 to 260° F. and a die temperature of 300 to 310° F. The tripolymer without the styrene acrylonitrile copolymer requires extruder barrel temperatures of 250 to 275° F. and a die temperature of 310 to 325° F. The tripolymer compositions of Example 4 containing 1 to 10% of the styrene acrylonitrile copolymer have excellent hot flow characteristics enabling the production by molding of high fidelity phonograph records having a high surface gloss.

EXAMPLE 5

The great utility of the vinyl halide polymer compositions of this invention in the production of electrical insulation for extreme service is illustrated by a rigid composition prepared as in Example 1 consisting of polyvinyl chloride and 10% by weight based on the polyvinyl chloride of a 75/25 styrene acrylonitrile copolymer. When such a composition and a standard plasticized polyvinyl chloride insulation compound are extruded about a copper wire as a primary insulation 3/32 to 1/64 in. thick the following physical and electrical properties are obtained:

| Insulation Properties | Plasticized Polyvinyl Chloride | Polyvinyl Chloride-10% Styrene Acrylonitrile Resin |
|---|---|---|
| Tensile Strength, lbs./sq. in | 2,000 to 3,000 | 6,500 to 8,500. |
| Hardness, Durometer @ 30° C | 65 to 95A | 82D. |
| Low Temperature Flexibility, 2 hrs./°F. passes. | −30 to −50° F | −70° F. |
| Air Oven Aging, 7 days at 100° C., Percent Retention of Elongation. | 70 to 90 | 100. |
| Insulation Resistance, megohms/1,000 ft. @ 50° C., 1/32 in. wall. | 50 to 100 | 20,000 to 35,000. |
| Dielectric Strength, Volts/mil @ 25° C. in water. | 700 to 900 | 1,200 to 1,300. |
| Power Factor @ 1,000 cycles @ 50° C. | 0.09 to 0.11 | 0.012 to 0.017. |
| Dielectric Constant @ 1,000 cycles @ 50° C. | 6 to 8 | 3.2 to 3.4. |
| Loss Factor @ 1,000 cycles @ 50° C. | 0.54 to 0.88 | 0.038 to 0.058. |

It is seen that in every respect the rigid polyvinyl chloride composition containing the styrene acrylonitrile resin is superior to the ordinary plasticized polyvinyl chloride compound.

EXAMPLE 6

A vinyl chloride polymerization mixture similar to that of Example 1 is carried to substantial completion at 40° C. and 10% by weight based on the polyvinyl chloride of a 75/25 mixture of styrene and acrylonitrile are added along with a small amount of additional catalyst and gelatin bentonite clay suspension agent. The polymerization is then continued until samples withdrawn from the reaction mixture indicate that substantially all of the monomeric styrene and acrylonitrile have been polymerized. The product obtained in good yield consists of uniform polymer particles or "pearls" which are easily separated from the aqueous phase. The styrene and acrylonitrile are found upon microscopic examination of the polymer particles to have polymerized over the original polyvinyl chloride particles. When the dried polymer is placed on a plastic mill or in a Banbury mixed it is easily reduced to a smooth homogeneous sheet. The resulting homogeneous composition is equivalent in every respect to the composition prepared in Example 1 by blending the separately-prepared polymers by mill-mixing.

EXAMPLE 7

The foregoing examples have demonstrated the utility of a 75/25 styrene acrylonitrile copolymer as a blending agent for various vinyl halide polymers. Styrene acrylonitrile copolymers made in aqueous medium from monomeric mixtures containing 50, 60, 70, 80 and 90% by weight, respectively, of styrene and the remainder of acrylonitrile have similar utility, all such copolymers being completely compatible with vinyl halide polymers and forming therewith homogeneous, easily-processed compositions.

EXAMPLE 8

A finely pulverulent tripolymer made in an aqueous emulsion medium similar to that of Example 1 from a mixture of monomeric materials consisting of 65% by weight of styrene, 25% acrylonitrile and 10% by weight of ethyl acrylate is blended with pulverulent polyvinyl chloride in 5/95 proportions. The resulting powder blend is easily formed into a smooth sheet on a plastic mill the rolls of which are maintained at 300° F. and is easily calendered and extruded at temperatures from 5 to 10° F. or more lower than plasticized forms of polyvinyl chloride. Similar results are obtained when another acrylic nitrile such as methacrylonitrile, chloroacrylonitrile and the like are substituted for acrylonitrile. Similar results also are obtained when from 10 to 20% by weight of vinyl acetate, vinyl benzoate, methyl methacrylate and other ester-type vinyl monomers are substituted for the ethyl acrylate utilized in the preparation of the tripolymer of this example.

The hard, tough and rigid thermoplastic compositions of this invention may be combined with stabilizers such as cadmium naphthenate, basic lead carbonate, lead silicate, lead titanate, calcium silicate, strontium salicylate, and others; mineral fillers such as fine ground hard clay, whiting, titanium dioxide, coloring pigments and others; carbon black, extenders, waxes, lubricants, plasticizers, other resinous substances and the like, as is well understood in the art.

While I have disclosed certain preferred manners of practicing my invention, I do not thereby desire or intend to limit myself solely thereto, for the precise proportions of the materials utilized may be varied and equivalent chemical materials may be employed, if desired, without departing from the spirit and scope of the invention as defined in the appended claims.

I claim:

1. A hard, tough and rigid thermoplastic resinous composition comprising a homogeneous mixture of (1) a tripolymer of 70 to 90% by weight vinyl chloride, 2 to 20% by weight vinylidene chloride, and 5 to 20% by weight of vinyl ester of a monocarboxylic acid and (2) a hard, tough, high molecular weight copolymer of 65 to 85% by weight of styrene and 15 to 35% by weight of acrylonitrile, the composition containing from 1 to 20% by weight of (2) based on the weight of (1).

2. A hard, tough and rigid thermoplastic resinous composition comprising a homogeneous mixture of (1) an interpolymer of 80% by weight vinyl chloride, 10% by weight vinylidene chloride, and 10% by weight vinyl acetate and (2) a hard, tough, high molecular weight copolymer of 75% styrene and 25% acrylonitrile, the composition containing from 1 to 20% by weight of (2) based on the weight of (1).

3. A hard, tough and rigid thermoplastic resinous composition comprising a homogeneous mixture of (1) a copolymer of 50 to 99% vinyl chloride and 1 to 50% vinylidene chloride and (2) a hard, tough, high molecular weight copolymer of 65 to 85% styrene and 15 to 35% acrylonitrile, the said composition containing from 1 to 20% by weight of (2) based on the weight of (1).

4. A hard, tough and rigid thermoplastic resinous composition comprising a homogeneous mixture of (1) polyvinyl chloride and (2) a hard, tough copolymer of 75% styrene and 25% acrylonitrile, the said composition containing from 1 to 20% by weight of (2) based on the weight of (1).

5. A hard, tough and rigid thermoplastic resinous composition comprising a homogeneous mixture of (1) a high molecular weight polyvinyl chloride and (2) a hard, tough copolymer of 75% styrene and 25% acrylonitrile, the said composition containing from 1 to 10% by weight of (2) based on the weight of (1).

6. The method of improving the processing characteristics of a normally hard, tough and horny polymer comprising predominantly a polymer of a monomeric material in which each constituent contains a single olefinic double bond and in which the predominant monomer is a vinyl halide, which method comprises first mixing with said vinyl halide polymer from 1 to 40% by weight thereof of a hard, tough interpolymer of a mono-olefinic monomeric mixture comprising from 50 to 90% by weight of a monomer selected from the class consisting of styren, chloro-, alkyl- and alkoxy-substituted styrenes and 10 to 50% by weight of an acrylic nitrile selected from the class consisting of acrylonitrile, methacrylonitrile, ethacrylonitrile and chloroacrylonitrile copolymerizable with styrene, said interpolymer containing not to exceed 20% by weight of other polymerized monoolefinic monomers, and then heating the resultant polymer mixture at a temperature of 200 to 400° F. to effect fusion of said vinyl halide polymer and said hard, tough interpolymer into a homogeneous mass.

7. The method of processing a normally hard, tough and horny unplasticized vinyl chloride polymer comprising predominantly polymerized vinyl chloride with lesser amounts of other polymerized monoolefinic monomers which method comprises first mixing said vinyl chloride polymer with 1 to 40% by weight thereof of a hard, tough copolymer of a monomeric mixture consisting of 50 to 90% by weight of styrene and 10 to 50% by weight of acrylonitrile and masticating the resulting mixture at a temperature of 200 to 400° F. to effect fusion of said vinyl halide polymer and said hard, tough styrene/acrylonitrile copolymer into a homogeneous mass.

8. The method of processing normally hard, tough and horny unplasticized polyvinyl chloride which comprises first mixing said polyvinyl chloride with 1 to 20% its weight of a hard, tough copolymer of a monomeric mixture of 65 to 85% by weight of styrene and 15 to 35% by weight of acrylonitrile and finally masticating the resulting mixture at a temperature of 200 to 400° F. to effect fusion of the said polyvinyl chloride and styrene/acrylonitrile copolymer into a homogeneous mass.

9. A thermoplastic resinous composition comprising a homogeneous mixture of a vinyl halide polymer of a monomeric material in which each constituent contains a single olefinic double bond and in which the predominant monomer is a vinyl halide, with a hard tough interpolymer of a monoolefinic monomeric mixture comprising 50 to 90% by weight of a monomer selected from the class consisting of styrene, chloro-, alkyl- and alkoxy-substituted styrenes and 10 to 50% by weight of an acrylic nitrile selected from the class consisting of acrylonitrile, methacrylonitrile, ethacrylonitrile and chloroacrylonitrile copolymerizable with styrene, said hard tough interpolymer containing not to exceed 20% by weight of other polymerized monoolefinic monomers, said composition containing from 1 to 40% by weight of hard tough interpolymer based on the weight of vinyl halide polymer.

10. A hard, tough and rigid thermoplastic resinous composition comprising a homogeneous mixture of a vinyl chloride polymer comprised predominantly of polymerized vinyl chloride with lesser amounts of other polymerized monoolefinic monomers, with a hard tough copolymer of 50 to 90% by weight of styrene and 10 to 50% by weight of acrylonitrile, said resinous composition to contain from 1 to 40% by weight of styrene acrylonitrile based on the weight of vinyl chloride polymer.

11. A hard, tough and rigid thermoplastic resinous composition comprising a homogeneous mixture of high-molecular weight polyvinyl chloride with a hard tough copolymer of 50 to 90% by weight of styrene and 10 to 50% by weight of acrylonitrile, said resinous composition containing 1 to 40% by weight of styrene acrylonitrile polymer based on the weight of polyvinyl chloride.

GARLAND B. JENNINGS.

References Cited in the file of this patent

UNITED STATES PATENTS

| Number | Name | Date |
| --- | --- | --- |
| 2,397,942 | Brookman et al. | Apr. 9, 1946 |
| 2,449,684 | Bacon et al. | Sept. 21, 1948 |

FOREIGN PATENTS

| Number | Country | Date |
| --- | --- | --- |
| 590,247 | Great Britain | July 11, 1947 |
| 609,291 | Great Britain | Sept. 28, 1948 |